April 8, 1930.  J. C. McDONALD  1,753,383
ELECTRICAL CONTROL SYSTEM
Filed May 14, 1928   2 Sheets-Sheet 1
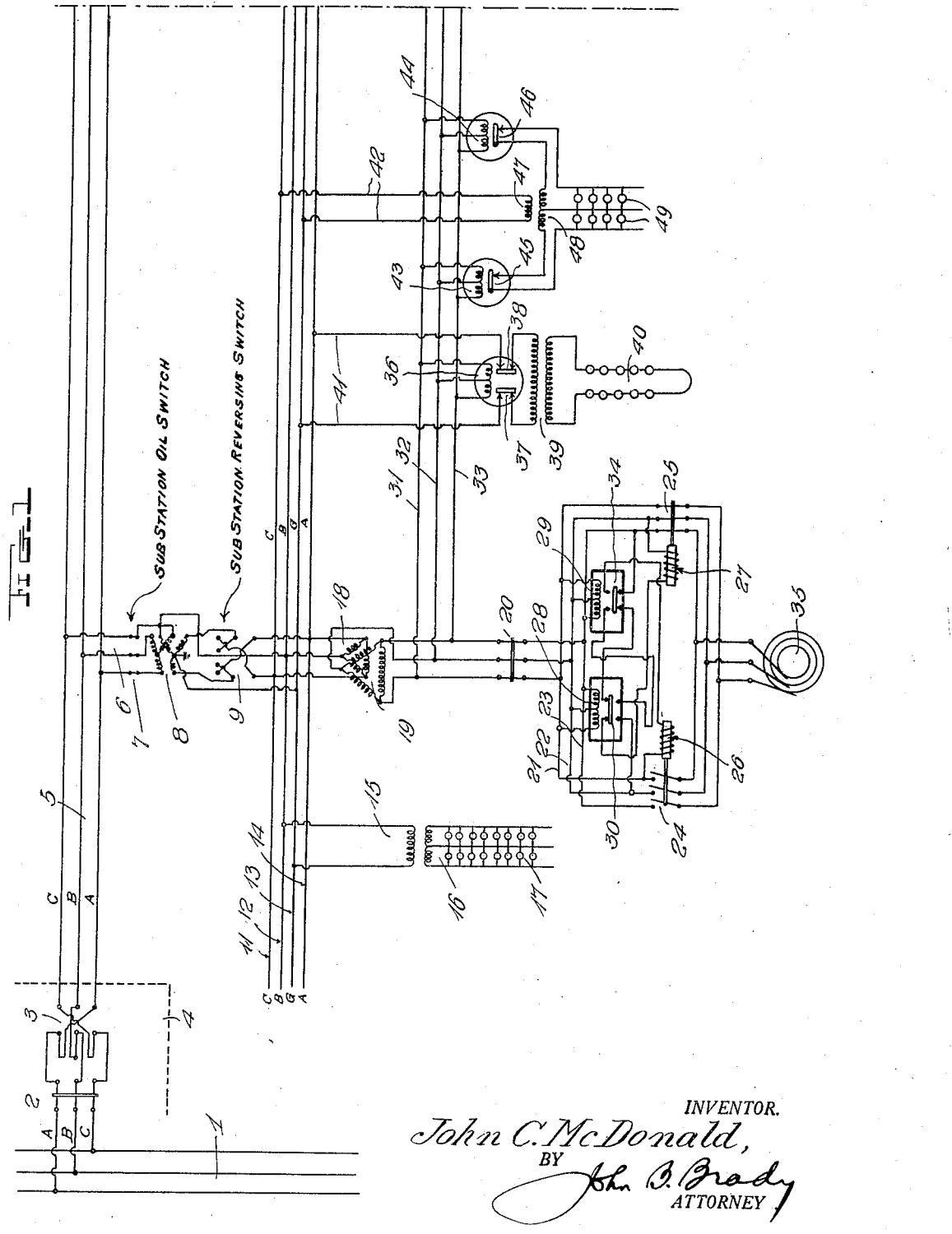

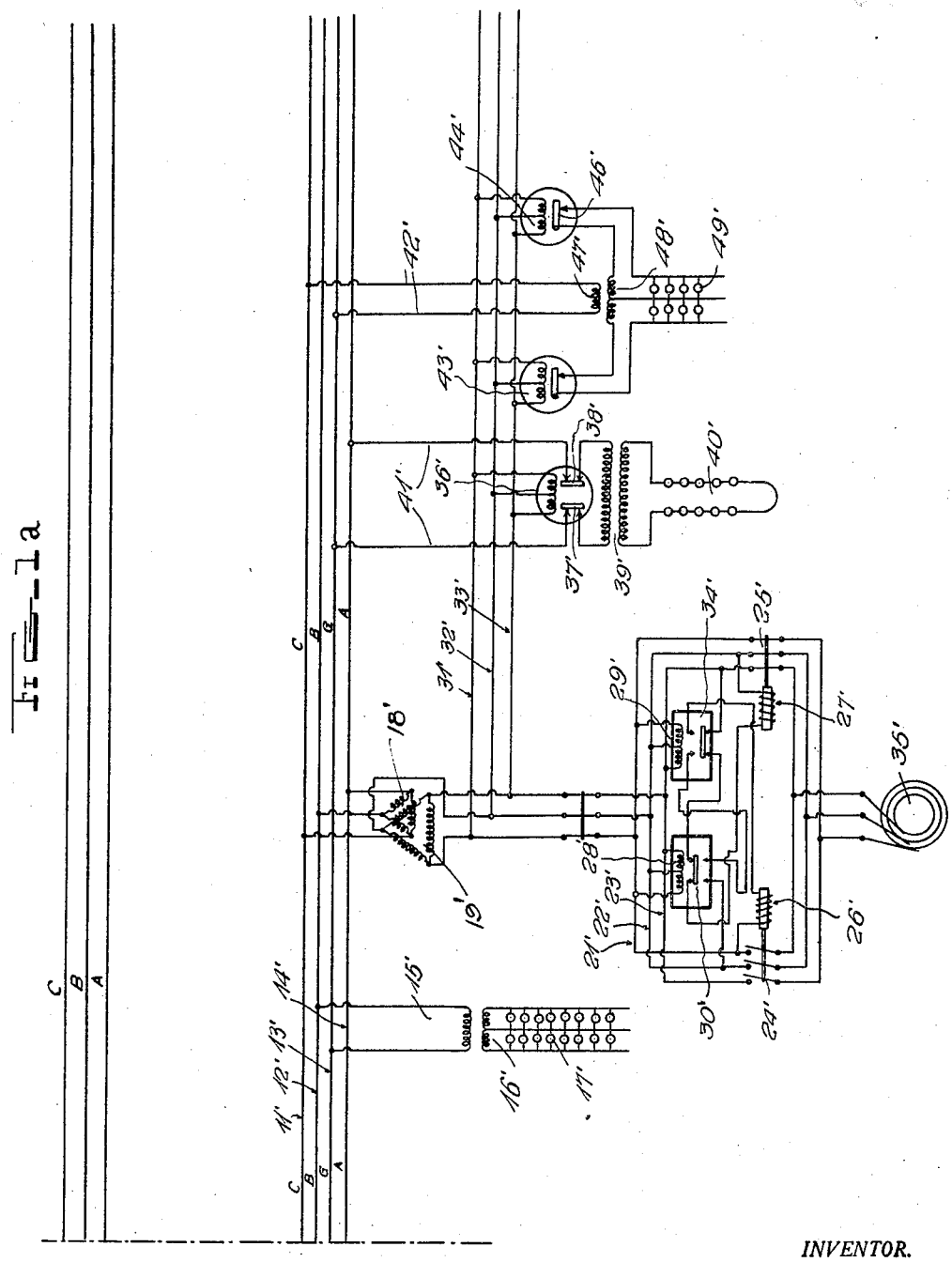

Patented Apr. 8, 1930

1,753,383

UNITED STATES PATENT OFFICE

JOHN C. McDONALD, OF NEW YORK, N. Y.

ELECTRICAL CONTROL SYSTEM

Application filed May 14, 1928. Serial No. 277,673.

My invention relates broadly to distribution and control systems and more particularly to a system for controlling power from a power-house or substation without the employment of special control lines.

One of the objects of my invention is to provide a system of power distribution for polyphase alternating current, wherein means are provided for distributing current of selected phase from a central station to load circuits connected to a line wire network, with means for reversing the phase sequence thereof and controlling by the operation of such phase reversal the condition of loads connected to those phases of the wire network.

Another object of my invention is to provide a composite power distribution system wherein energy is distributed to a plurality of loads of different characteristics, and the phase sequence of the energy to selected loads reversed to selectively control the condition of the loads supplied from said phases independent of the condition of the loads supplied by other phases.

Still another object of my invention is to provide a composite system of power distribution for polyphase currents wherein selected phase currents may be supplied to loads of a predetermined character and other phase currents supplied to loads of radically different character, with means for effecting a phase reversal of certain of said phase currents while maintaining the continuity of phase in others of said phases for controlling by such operation the condition of the load connected to the reversable phases independently of the load connected to the continuous phases.

A further object of my invention is to provide a system of power control over a line wire network wherein a polyphase power supply system is arranged to energize a composite feeder system for distributing selected phases of the current to loads of different characteristics, with means for reversing the phase of selected phases while maintaining continuous operation on other phases whereby a reversal in phase current of selected ones of said phases may be utilized to control the condition of the load connected thereto independently of the operation of loads connected to the continuous phases.

My invention further resides in the arrangement of connections in a power distribution system as described more fully in the specification hereinafter following by reference to the accompanying drawings in which:

Figure 1 is a diagrammatic view showing the arrangement of wiring in a power distribution system embodying the principles of my invention; and Fig. 1ª is a wiring diagram forming a continuation of the wiring in Fig. 1.

In the power distribution system of my invention I provide means for distributing polyphase current from a central station over a line wire network to a composite feeder system. The power is supplied to the composite feeder system so that independent phase currents may be selected from the composite feeder system. Certain of the phase currents from the composite feeder system may be employed to supply power to load circuits of selected characteristics while other phase currents of the composite feeder system supply power to loads of different characteristics. I provide means in the central station for effecting a phase reversal of the power supply to the power distribution system for control of loads on selected ones of the phases of the composite feeder system. I provide independent means at the substation for effecting a reversal in phase current of selected ones of the phases supplied to the composite feeder system. I provide connections from those phases of the composite feeder system which may be subjected to a phase reversal of the polyphase relay apparatus. The polyphase relays employed in the power distribution system of my invention are of the construction shown more clearly in my Letters Patent No. 1,601,922, dated October 5, 1926 and No. 1,619,080, dated March 1, 1927. By supplying the polyphase windings of the relays with energy in a given sequence the relay contacts are closed. By a reversal in phase current of the energy through the relay windings the relay contacts may be opened. By the provision of the composite feeder system certain selected loads are not disturbed when a phase reversal of energy supplied to other phases of the composite feeder is effected. This permits the connection of lighting loads of an extremely important character where constant illumination must be maintained and wherein a blink due to phase reversal is undesirable to those phases of the composite feeder which are not reversed. The lighting loads may be connected to those phases of the composite feeder system which are maintained continuous regardless of the reversal of phase of the other phases of the composite feeder system. Those loads which are to be controlled are connected to the phases of the composite feeder system which are subject to reversal. Where the load may be in the nature of power driven equipment such as electric motors a protective board is interposed between the motor load and the power supply circuit for preventing injury to the load by virtue of a phase reversal. The blink hereinbefore referred to does not impair the operation of the system even when supplying lighting loads of a relatively continuous character, as it will be appreciated that the control from the substation to the load occurs not more than twice each twenty-four hours, that is the turning on of power to a lighting load upon the approach of dusk in the evening and the cutting off of the lighting load in the early morning hours. This operation occurs without the necessity of employing separate control lines but by the operation of a control over the same line which supplies power to the load. Such blink occurs at such times during the twenty-four hours as not to be a serious disadvantage, and in fact the blink occurs over such an infinitesimal period of time as to be practically unnoticeable.

Referring more particularly to the drawings, reference character 1 designates the main busses of a polyphase power supply circuit station in a power generating station extending through main switch 2 in the relation A, B, C. A phase reversing switch 3 is provided in the power generating station 4 so that power may be supplied over line wire system 5 with the phase current in the direction A, B, C, or in the direction C, B, A. I have designated a branch feeder at 6 leading to a substation which may include the substation oil switch 7 and the Y connected transformer bank 8. The substation is provided with a phase reversing switch designated at 9 and connections are taken from the phase reversing switch system to selected ones of the lines in the composite feeder system A, G, B, C. A connection is taken from the Y connected transformer system to the leads 12 and 13 in the composite feeder system for impressing a continuous current on these conductors which is not subject to a change in phase sequence under control of the substation reversing switch 9. Connections are taken from the switch system 9 to the wire lines 11, 12 and 14 for impressing energy upon the composite distribution system which is subject to reversal by operation of the substation reversing switch 9. I have shown a delta connected power distribution transformer 18 having a secondary system 19 connected therewith for supplying power to subscribers. I have shown connections 31, 32 and 33 leading from the secondary 19 of the transformer system 18 with connections to the polyphase windings of relays at 36, 43 and 44. Relay 36 is provided with sets of contacts and armature members 37 and 38 for controlling the supply of lighting potential from the phase A, G of the composite wire network through conductors 41. A transformer is shown at 39 having its secondary windings supplying the series connected load 40 in the form of a system of lamps. Relays 43 and 44 are employed to control a multiple system of lines 49 energized from secondary winding 48 of transformer 47 which connects through wire 42 with phase G, C. In order to effect a control of the loads 40 and 49 the phase current is reversed at switch 9. However, this will not affect the condition of the lighting load 17 which connects to secondary winding 16 with primary winding 15, which is in turn connected across phase B G. In order to avoid injury to motors or rotating apparatus which may be connected to power supply systems through a switch 20 I provide a protective apparatus consisting of polyphase relays 28 and 29 connected to lines 21, 22 and 23. The relays 28 and 29 are arranged with a system of contacts 30 and 34 for controlling the operation of solenoids 26 and 27, which in turn actuate switches 24 and 25 in such manner that energy of the same phase is always supplied to the rotating apparatus 35 and under conditions of change in phase sequence on a line wire distribution circuit by the intentional control of the circuit by operation of switch 9 the supply to the rotating apparatus 35 will not be changed.

In order that the operation of the system may be entirely clear I have shown in Fig. 1ª an extension of the arrangement shown in Fig. 1 and have represented similar circuits by corresponding reference characters with a prime symbol added thereto. That is to say, the store or important lighting in which no blink is desired has been represented as connected through conductors 15', whereas the circuits which are to be controlled are connected through conductors 31', 32' and 33' to the control relays of the load circuits 40' and 49'. The rotative apparatus which is to be protected is indicated at 35'.

The reversal of phase sequence which is employed for controlling certain of the phase currents of the power distribution line is brought about by the change in position of an oil switch system. The operation of phase change on a feeder system requires approximately a 6-cycle period or about one-tenth of a second, which is substantially less than an interruption in the circuit which is a daily incident in the operation of a power distribution system. It is not unusual during a twenty-four hour period in power distribution systems now in operation to open and restore as many as thirty feeders each carrying a load. Such feeders are opened and restored for various reasons, that is, cable repairs outside of the central station or substation, the repairing of cables or the changing of apparatus in a main station or substation or under conditions of overload. Often such breaks and restorations occur at 800–2500 amperes. In the system of my invention those phases of the composite distribution circuit which are reversed are opened instantaneously and closed immediately, giving negligible reaction on the line system.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a power distribution and control system, a generator of polyphase current, a three wire distribution circuit connected to said generator, a four wire distribution circuit coupled with said three wire distribution circuit, a plurality of loads of different characteristics connected to selected phases of said four wire distribution circuit, means disposed between said generator and said three wire distribution circuit for reversing the sequence of the phase of the currents in said three wire distribution circuit, and independent means interposed between said three and four wire distribution circuits for reversing the sequence of phase of the currents in certain of the phases of said four wire distribution circuit, while maintaining the continuity of at least one of the phases of said polyphase current independent of any change in condition of the other phase currents.

2. In a power distribution and control system, a generator of polyphase current, a plurality of conductors for distributing said current, means for transferring said polyphase current to a plurality of feeder conductors greater in number than the number of said aforementioned conductors, composite loads connected to said last mentioned conductors, and circuit controlling means disposed between said feeder conductors and said aforementioned conductors for reversing the phase sequence of less than the whole number of phases of said polyphase current, while maintaining the continuity of phase of at least one of said phases independent of changes in the other phase currents.

In testimony whereof I affix my signature.

JOHN C. McDONALD.